United States Patent
Nakata et al.

(10) Patent No.: US 7,439,635 B2
(45) Date of Patent: *Oct. 21, 2008

(54) OUTPUT SUPPRESSING METHOD OF A PLURALITY OF DISPERSED POWER SOURCES AND DISPERSED POWER SOURCE MANAGING SYSTEM

(75) Inventors: Hirofumi Nakata, Nara (JP); Mitsuo Okamoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/808,437

(22) Filed: Jun. 11, 2007

(65) Prior Publication Data

US 2007/0241617 A1    Oct. 18, 2007

Related U.S. Application Data

(63) Continuation of application No. 10/680,212, filed on Oct. 8, 2003.

(30) Foreign Application Priority Data

Oct. 11, 2002    (JP) .............................. 2002-299018

(51) Int. Cl.
  H02J 7/00 (2006.01)
  H02J 9/00 (2006.01)
  H02J 3/00 (2006.01)
  H02M 1/10 (2006.01)
(52) U.S. Cl. .............................. 307/66; 307/69; 307/29
(58) Field of Classification Search .................. 307/23, 307/29, 64, 66, 69, 71
  See application file for complete search history.

(56) References Cited

U.S. PATENT DOCUMENTS 4,894,764 A     1/1990  Meyer et al.
5,754,033 A  *  5/1998  Thomson ..................... 322/45
5,784,237 A     7/1998  Velez (Continued)

FOREIGN PATENT DOCUMENTS

JP    6-133472 A    5/1994

(Continued)

*Primary Examiner*—Michael J Sherry
*Assistant Examiner*—Michael Rutland Wallis
(74) *Attorney, Agent, or Firm*—Nixon & Vanderhye, P.C.

(57) ABSTRACT

Regarding output suppression control of a plurality of dispersed power sources linked to a high-voltage-to-low-voltage transformer of a commercial power system, the partiality of the output suppression of a plurality of dispersed power sources is eliminated and, cost increase of the dispersed power sources is prevented. If a voltage at a power receiving point of a dispersed power source 1a exceeds the upper limit of a proper value, then a power conditioner 4 suppresses an output to a power receiving point to store a surplus power into a storage battery 8 and transmit an output suppression start signal to a management unit 9. The management unit 9 transmits an output suppression command signal to the other dispersed power sources 1b through 1e of which the voltage at the power receiving point is not exceeding the upper limit of the proper value to make the other dispersed power sources 1b through 1e to suppress their outputs and store surplus power into storage batteries 8. The plurality of dispersed power sources 1a through 1e can be thus made to impartially suppress the outputs, so that the capacity of the storage batteries 8 can be reduced.

9 Claims, 3 Drawing Sheets

U.S. PATENT DOCUMENTS

| | | |
|---|---|---|
| 5,917,251 A | 6/1999 | Schermann et al. |
| 6,433,444 B1 | 8/2002 | De Vries |
| 6,459,171 B1 | 10/2002 | Leifer |
| 6,522,031 B2 | 2/2003 | Provanzana et al. |
| 6,816,757 B1 | 11/2004 | De La Ree et al. |
| 6,921,987 B2 | 7/2005 | Marin-Martinod |
| 7,105,950 B2 * | 9/2006 | Bemat et al. ................ 307/52 |

FOREIGN PATENT DOCUMENTS

| | | |
|---|---|---|
| JP | 9172780 | 6/1997 |
| JP | 9172784 | 6/1997 |
| JP | 11-127546 A | 5/1999 |
| JP | 2000-232736 A | 8/2000 |
| JP | 2001-352682 A | 12/2001 |
| JP | 2002-1152976 | 5/2002 |

* cited by examiner

OUTPUT SUPPRESSING METHOD OF A PLURALITY OF DISPERSED POWER SOURCES AND DISPERSED POWER SOURCE MANAGING SYSTEM

This application is a continuation of U.S. patent application Ser. No. 10/680,212 filed Oct. 8, 2003, which claims priority under 35 U.S.C. § 119(a) on Patent Application 2002-299018 filed in Japan on Oct. 11, 2002, the entire contents of which are incorporated herein by reference.

BACKGROUND OF THE INVENTION

The present invention relates to a plurality of dispersed power sources linked to a high-voltage-to-low-voltage transformer of a commercial power system, and in particular, to an output suppressing method of a plurality of dispersed power sources and a dispersed power source managing system.

For example, solar batteries and the like are independent DC (Direct Current) power sources capable of outputting a DC power without interposition of other energy sources and known as clean simple energy sources that discharge no toxic substance.

FIG. 3 shows a conventional power supply system that transforms a DC power generated by such an independent DC power source into an AC (Alternating Current) power and In the power supply system shown in FIG. 3, a plurality of dispersed power sources 101a, 101b, 101c, 101d and 101e are connected to a high-voltage 6600-V system wire to low-voltage 200-V system wire transformer 106 (hereinafter referred to as a transformer) of a commercial power system 102. Among these plurality of dispersed power sources 101a, 101b, 101c, 101d and 101e, the dispersed power sources 101a, 101b, 101c and 101d have same construction. The dispersed power source 101a is constructed of a solar battery 103 that serves as a DC power source, a power conditioner 104 for transforming the DC power into an AC power, an electrical load 105 connected to the output side of this power conditioner 104, and a breaker 107 that connects or disconnects the power conditioner 104 to or from the commercial power system 102 and is linked to the commercial power system 102. The dispersed power source 101a executes maximum power point tracking control for producing a maximum output of the solar battery 103 in the daytime during which there is light of solar radiation. Then, the dispersed power source 101a transforms the obtained DC power into an AC power by the power conditioner 104, supplies the obtained AC power to the electrical load 105, supplies the AC power to the commercial power system 102 when a surplus power is generated (this is called a reverse power flow phenomenon) and supplies the AC power from the commercial power system 102 to the electrical load 105 when power shortage occurs.

When the dispersed power source 101a supplies the surplus power to the commercial power system 102, a voltage at a power receiving point RPa of the dispersed power source 101a increases in comparison with the case where no surplus power is supplied. That is, since a current reversely flows from the dispersed power source 101a to the commercial power system 102, a voltage increase value $\Delta V$ at the power receiving point RPa is determined by the internal impedance of the transformer 106, the impedance of a wiring 112a extended from the power receiving point RPa to the transformer 106 and the reversely flowing generated current. According to the Electricity Enterprises Act, the voltage at the power receiving point RPa of the dispersed power source 101a is required to be maintained within a proper value range of 101±6 V with respect to the standard voltage of 100 V. If the voltage at the power receiving point RPa increases and exceeds an upper limit of a proper value as a consequence of the supplying of the surplus power from the dispersed power source 101a to the commercial power system 102, then the output of the power conditioner 104 is suppressed so as not to exceed the upper limit of the proper value. In concrete, if the voltage at the power receiving point RPa of the dispersed power source 101a exceeds the upper limit of the proper value, then the power conditioner 104 executes the control of suppressing the output power by limiting the amount of the DC power from the solar battery 103 with the normally executed maximum power point tracking control stopped. By thus suppressing the output power of the power conditioner 104, the increase in the voltage at the power receiving point RPa of the dispersed power source 101a is suppressed by reducing the current reversely flowing from the dispersed power source 101a to the commercial power system 102. If the voltage at the power receiving point RPa of the dispersed power source 101a falls below the upper limit of the proper value, then the power conditioner 104 cancels the output suppressing control and restarts the maximum power point tracking control. By repetitively executing these control sequences, the voltage at the power receiving point RPa of the dispersed power source 101a is maintained at the proper value.

Moreover, among the plurality of dispersed power sources 101a, 101b, 101c, 101d and 101e, the dispersed power source 101e differs from the dispersed power sources 101a, 101b, 101c and 101d only in that it has a storage battery 108. That is, the dispersed power source 101e is constructed of a solar battery 103 that serves as a DC power source, a storage battery 108, a power conditioner 104 for transforming the DC power into an AC power, an electrical load 105 connected to the output side of this power conditioner 104, and a breaker 107 that connects or disconnects the power conditioner 104 to or from the commercial power system 102 and is linked to the commercial power system 102. The dispersed power source 101e transforms a DC power obtained by executing the maximum power point tracking control for producing the maximum output of the solar battery 103 in the daytime during which there is light of solar radiation into an AC power by the power conditioner 104, supplies the obtained AC power to the electrical load 105. When power shortage occurs, the AC power of the shortage is supplied from the commercial power system 102 to the electrical load 105. When a surplus power occurs, the power is not supplied to the commercial power system 102 but stored into the storage battery 108 located on the input side of the power conditioner 104. As described above, the voltage at the power receiving point RPe of this dispersed power source 101e does not increase unless the reverse flow occurs from the dispersed power source 101e to the commercial power system 102, and the voltage at the power receiving point RPe of this dispersed power source 101e can maintain the proper value.

However, the plurality of conventional dispersed power sources 101a, 101b, 101c, 101d and 101e individually execute the output suppression control. Therefore, the outputs are controlled sequentially from the dispersed power source of which the voltage at the power receiving point exceeding the upper limit of the proper value is detected earliest among the plurality of dispersed power sources 101a, 101b, 101c, 101d and 101e. Then, the voltages at the power receiving points of all the dispersed power sources 101a, 101b, 101c, 101d and 101e enter a state in which they do not exceed the upper limit of the proper value. In the above state, there exist in mixture the dispersed power source of which the output suppression is being executed and the dispersed power source of which the output suppression is not being executed. Accordingly, there has been a problem that the dispersed power source of which the output suppression is being executed is partially handled in view of the effective use of the power from the solar battery in comparison with the dispersed power source of which the output suppression is not required to be executed.

Moreover, when the storage battery 108 is provided inside the dispersed power source 101e and the surplus power is stored in the storage battery 108 without making a reverse flow to the commercial power system 102, the voltage at the power receiving point RPe of the dispersed power source 101e can be maintained low. However, for the above purpose, there has been a problem that the capacity of the storage battery 108 has been required to be increased, leading to the cost increase of the dispersed power source 101e.

BRIEF SUMMARY

The present invention is made to solve the aforementioned problems and has an object to provide an output suppressing method of a plurality of dispersed power sources and a dispersed power source managing system capable of eliminating the partiality of the output suppression of a plurality of dispersed power sources regarding the output suppression control of the plurality of dispersed power sources linked to a high-voltage-to-low-voltage transformer of a commercial power system and preventing the cost increase of the dispersed power sources.

In order to solve the aforementioned problems, the present invention provides an output suppressing method of a plurality of dispersed power sources comprising:

suppressing an output of a dispersed power source when a voltage at a power receiving point of the dispersed power source among the plurality of dispersed power sources linked to a high-voltage-to-low-voltage transformer of a commercial power system exceeds an upper limit of a proper value; and further suppressing outputs of the other dispersed power sources of which the voltages at power receiving points do not exceed the upper limit of the proper value.

According to the output suppressing method of the plurality of dispersed power sources of the above-mentioned construction, if the voltage at the power receiving point of a certain dispersed power source exceeds the upper limit of the proper value, then the output of the dispersed power source is suppressed, and the output of the other dispersed power sources of which the voltage at the power receiving point is not exceeding the upper limit of the proper value is also suppressed. Therefore, the voltage at the power receiving point of the dispersed power source can reliably be suppressed within the proper value, and the outputs of the plurality of dispersed power sources linked to the high-voltage-to-low-voltage transformer of the commercial power system can be impartially suppressed.

Concrete methods for suppressing the outputs of the dispersed power sources include a method for suppressing the output power by storing the electric power in a storage battery provided for each of the dispersed power sources, a method for suppressing the output power by stopping the normally executed maximum power point tracking control and limiting the amount of DC power from a solar battery in each of the dispersed power sources and so on. Particularly when the suppressed electric power is stored into the storage battery provided for each of the dispersed power sources, the normally executed maximum power point tracking control can be continued, and the electric power can be stored into the plurality of storage batteries by impartially suppressing the outputs. Therefore, the capacity of each of the storage batteries can be reduced, and the cost can be reduced.

The dispersed power source output suppressing method of one embodiment comprises the steps of:

determining whether or not the voltage at the power receiving point of each of the plurality of dispersed power sources exceeds the upper limit of the proper value;

suppressing the output of the dispersed power source of which the voltage at the power receiving point exceeds the upper limit of the proper value and transmitting an output suppression start signal from the dispersed power source to a management unit;

transmitting an output suppression command signal from the management unit that has received the output suppression start signal to the dispersed power sources other than the dispersed power source that has transmitted the output suppression start signal; and suppressing the output of the dispersed power source that has received the output suppression command signal.

According to the above-mentioned embodiment, if it is determined that the voltage at the power receiving point of a certain dispersed power source exceeds the upper limit of the proper value, then the dispersed power source suppresses the output thereof and transmits the output suppression start signal from the dispersed power source to the management unit. Upon receiving the output suppression start signal, the management unit transmits the output suppression command signal to the dispersed power sources other than the dispersed power source that has transmitted the output suppression start signal. Then, the dispersed power sources, which receive the output suppression command signal, also suppress the outputs thereof.

As described above, the outputs of the plurality of dispersed power sources can be impartially suppressed under the management of the management unit that can be installed in a place remote from the plurality of dispersed power sources, and the voltages at the power receiving points of the dispersed power sources can reliably be suppressed within the proper value.

Moreover, the dispersed power source output suppressing method of one embodiment comprises the steps of:

canceling control of the output suppression of the dispersed power source that has transmitted the output suppression start signal, by the dispersed power source itself when the voltage at the power receiving point of the dispersed power source becomes equal to or lower than the upper limit of the proper value and transmitting an output suppression cancel signal to the management unit;

transmitting an output suppression cancel command signal from the management unit that has received the output suppression cancel signal to the dispersed power sources other than the dispersed power source that has transmitted the output suppression cancel signal; and canceling the suppression of the output of the dispersed power source that has received the output suppression cancel command signal.

According to the above-mentioned embodiment, if the voltage at the power receiving point of the dispersed power source of which the output is suppressed becomes equal to or lower than the upper limit of the proper value, then the suppression of the output of the dispersed power source is canceled by the dispersed power source itself, and the output suppression cancel signal is transmitted to the management unit by the dispersed power source. Upon receiving the output suppression cancel signal, the management unit transmits the output suppression cancel command signal to the dispersed power sources other than the dispersed power source that has transmitted the output suppression cancel signal, thereby making the dispersed power sources cancel the suppression of the output.

As described above, if the voltage at the power receiving point of the dispersed power source that is suppressing the output becomes equal to or lower than the upper limit of the proper value and the need for suppressing the output is obviated, then the plurality of dispersed power sources can be made to impartially cancel the output suppression under the management of the management unit that can be installed in a place remote from the plurality of dispersed power sources.

Moreover, in the output suppressing method of a plurality of dispersed power sources of one embodiment, each of the dispersed power sources comprises a storage battery, stores a suppression power corresponding to the suppressed part into the storage battery inside the dispersed power source and gradually increases the suppression power to be stored.

According to the above-mentioned embodiment, the suppressed power is stored into the storage battery inside the dispersed power source, and therefore, the power generating capacity of, for example, a solar battery or the like in the dispersed power source can be effectively utilized. Moreover, the suppressed power to be stored into the storage battery is gradually increased, and therefore, the output suppression can be prevented from being excessively effected.

The dispersed power source managing system of the present invention comprises a plurality of dispersed power sources linked to a high-voltage-to-low-voltage transformer of a commercial power system; and a management unit for managing the plurality of dispersed power sources; wherein the dispersed power sources each comprises:

a DC power source; a transformation means for transforming a DC power from the DC power source into an AC power and outputting the AC power; a storage battery; a voltage detection means for detecting a voltage at a power receiving point; an output suppressing means for suppressing the AC power to be supplied to the power receiving point when the voltage at the power receiving point exceeds an upper limit of a proper value and supplying an electric power to the storage battery; an output suppression canceling means for canceling the output suppression by the output suppressing means when the voltage at the power receiving point becomes equal to or lower than the upper limit of the proper value; a transmission means for transmitting an output suppression start signal and an output suppression cancel signal to the management unit on the basis of outputs of the output suppressing means and the output suppression canceling means; and a reception means for receiving an output suppression command signal and an output suppression cancel command signal for operating the output suppressing means and the output suppression canceling means from the management unit, and wherein the management unit comprises:

a reception means for receiving the output suppression start signal and the output suppression cancel signal from each of the dispersed power sources and a transmission means for transmitting the output suppression command signal and the output suppression cancel command signal to each of the dispersed power sources.

According to the dispersed power source managing system of the above-mentioned construction, the DC power from the DC power source is transformed into the AC power by the transformation means in each of the dispersed power sources and supplied to the power receiving point, and the voltage at this power receiving point is detected by the voltage detection means. The output suppressing means executes control so as to determine whether or not the voltage at the power receiving point detected by the voltage detection means exceeds the upper limit of the proper value and to suppress the AC power to be supplied to the power receiving point and supply the power to the storage battery when the voltage at the power receiving point exceeds the upper limit of the proper value.

It is acceptable to rectify the AC power from the transformation means and supply the DC power to the storage battery or to supply the DC power from the DC power source in the stage preceding the transformation means. If the DC power obtained by rectifying the AC power from the transformation means is supplied to the storage battery, the maximum power point tracking control or the like normally executed to produce the maximum power from the DC power source of the solar battery or the like can be utilized as it is without modification. Accordingly, there is an advantage that the system can be prevented from being complicated.

Furthermore, the output suppressing means executes the aforementioned control of output suppression, outputs the signal to the transmission means and transmits the output suppression start signal from the transmission means to the management unit located in, for example, a remote place. Upon receiving the output suppression start signal by the reception means, the management unit transmits the output suppression command signal to the dispersed power sources other than the dispersed power source that has transmitted the output suppression start signal. Then, the other dispersed power sources, which receive the output suppression command signal, also store electric power into the storage batteries and suppress the outputs thereof.

As described above, it is possible to make the plurality of dispersed power sources impartially suppress the outputs under the management of the management unit that can be installed in a place remote from the plurality of dispersed power sources, allowing the voltages at the power receiving points of the dispersed power sources to be reliably suppressed within the proper value.

On the other hand, if the output suppression canceling means of the dispersed power source that has transmitted the output suppression start signal determines that the voltage at the power receiving point has become equal to or lower than the upper limit of the proper value on the basis of the output of the voltage detection means of the dispersed power source, then the output suppression canceling means cancels the output suppression by the output suppressing means in the dispersed power source and transmits the output suppression cancel signal to the management unit via the transmission means. Upon receiving the output suppression cancel signal, the management unit transmits the output suppression cancel command signal to the dispersed power sources other than the dispersed power source that has transmitted the output suppression cancel signal. Upon receiving the output suppression cancel command signal via the reception means, the output suppression canceling means of the other dispersed power sources cancel the control of the output suppression by the output suppressing means.

As described above, if the voltage at the power receiving point of the dispersed power source that is suppressing the output becomes equal to or lower than the upper limit of the proper value and the need for suppressing the output is obviated, then the plurality of dispersed power sources can be made to impartially cancel the output suppression under the management of the management unit that can be installed in a place remote from the plurality of dispersed power sources.

Moreover, in the dispersed power source managing system of one embodiment, the dispersed power sources each comprises a rectification means for rectifying an AC power from the transformation means and forming a DC power, and the suppression power corresponding to the part suppressed by the output suppressing means is transformed from the AC power to a DC power by the rectification means and stored into the storage battery.

In the above-mentioned embodiment, the AC power from the transformation means is rectified by the rectification means so as to be transformed into a DC power and stored into the storage battery. Therefore, the maximum power point tracking control or the like to produce the maximum power from the DC power source of the solar battery or the like can be utilized as it is, and the system can be prevented from being complicated.

Moreover, in the dispersed power source managing system of one embodiment, the DC power source is a solar battery.

According to the above-mentioned embodiment, the AC power can be supplied to a commercial power system and an electrical load by utilizing the inexhaustible solar energy. Moreover, the voltages at the power receiving points of the dispersed power sources can be prevented from exceeding the upper limit of the proper value.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE PREFERRED EMBODIMENTS

Figure 1:
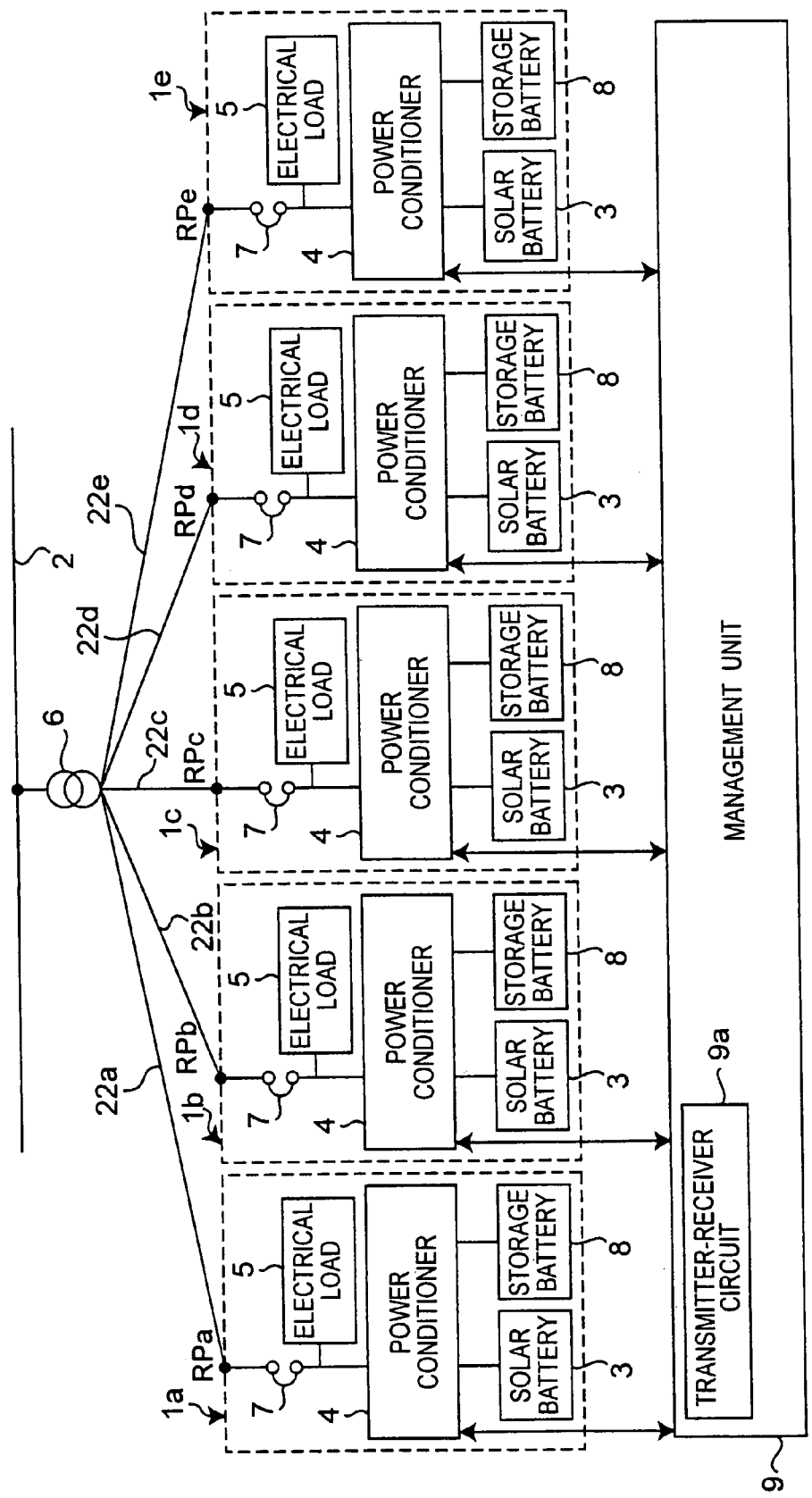
FIG. 1 is a block diagram of a dispersed power source managing system of a first example embodiment.

The present invention will be described in detail below with reference to the embodiment shown in the drawings.

FIG. 1 is a block diagram of the dispersed power source managing system for suppressing the increase of the system voltage of a commercial power system of the first embodiment of the present invention. In FIG. 1, a plurality of dispersed power sources 1a, 1b, 1c, 1d and 1e are connected to a high-voltage 6600-V system wire to low-voltage 200-V system wire transformer 6 (hereinafter referred to as a transformer) of a commercial power system 2, and output suppression of the plurality of dispersed power sources 1a through 1e is further executed by a management unit 9 located in a remote place. The plurality of dispersed power sources 1a through 1e are each constructed of a solar battery 3 that serves as one example of a DC power source, a storage battery 8, a power conditioner 4 for transforming the DC power into an AC power, an electrical load 5 connected to the output side of this power conditioner 4, and a breaker 7 for connecting or disconnecting the power conditioner 4 to or from the commercial power system 2.

As shown in FIG. 1, the management unit 9 includes a transmitter-receiver circuit 9a that serves as one example of the reception means and the transmission means and operates to receive an output suppression start signal and an output suppression cancel signal from the power conditioners 4 of the dispersed power sources 1a through 1e and transmit an output suppression start command and an output suppression cancel command to the power conditioners 4.

Figure 2:
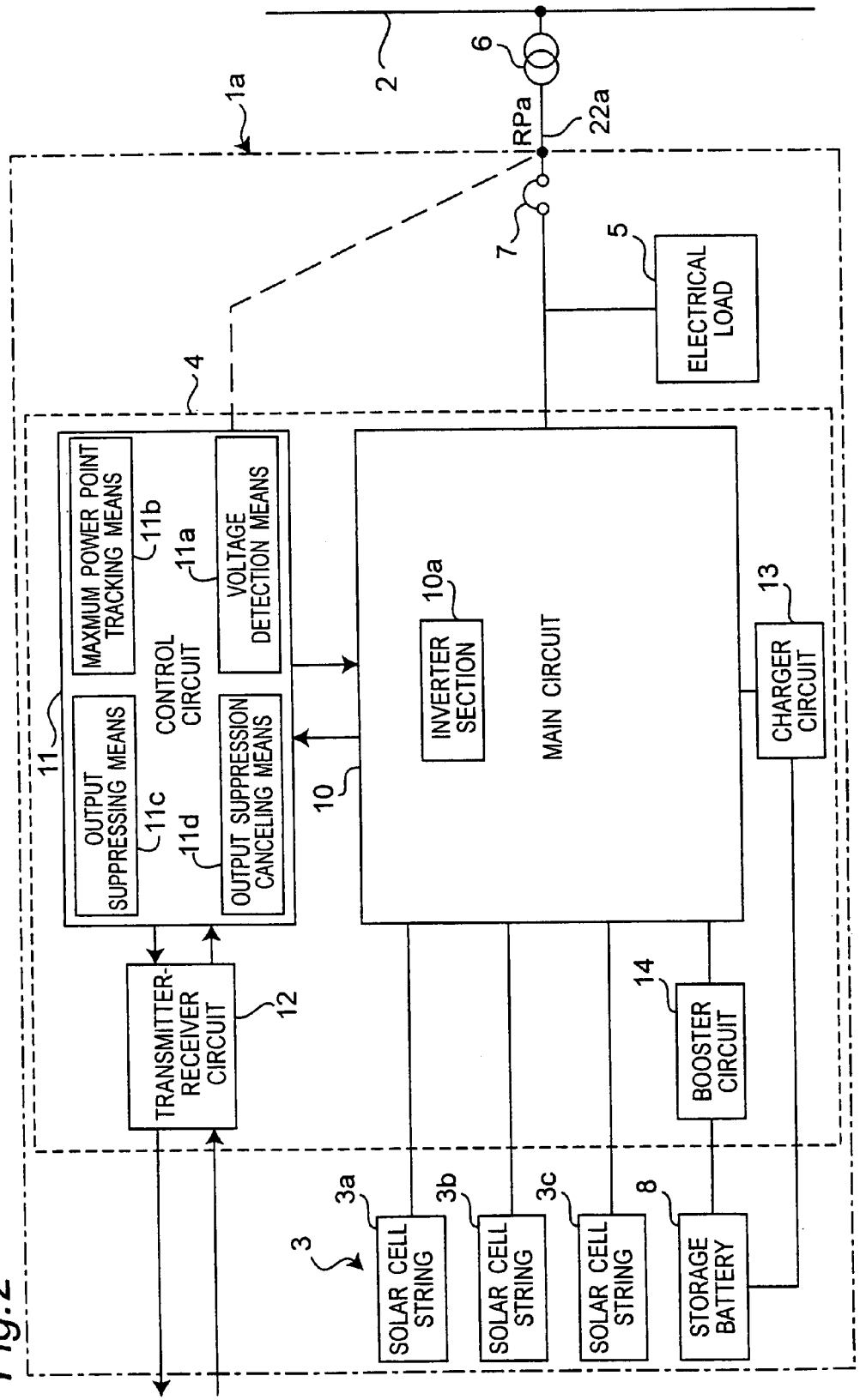
FIG. 2 is a block diagram of a dispersed power source of the above example embodiment.
Figure 3:
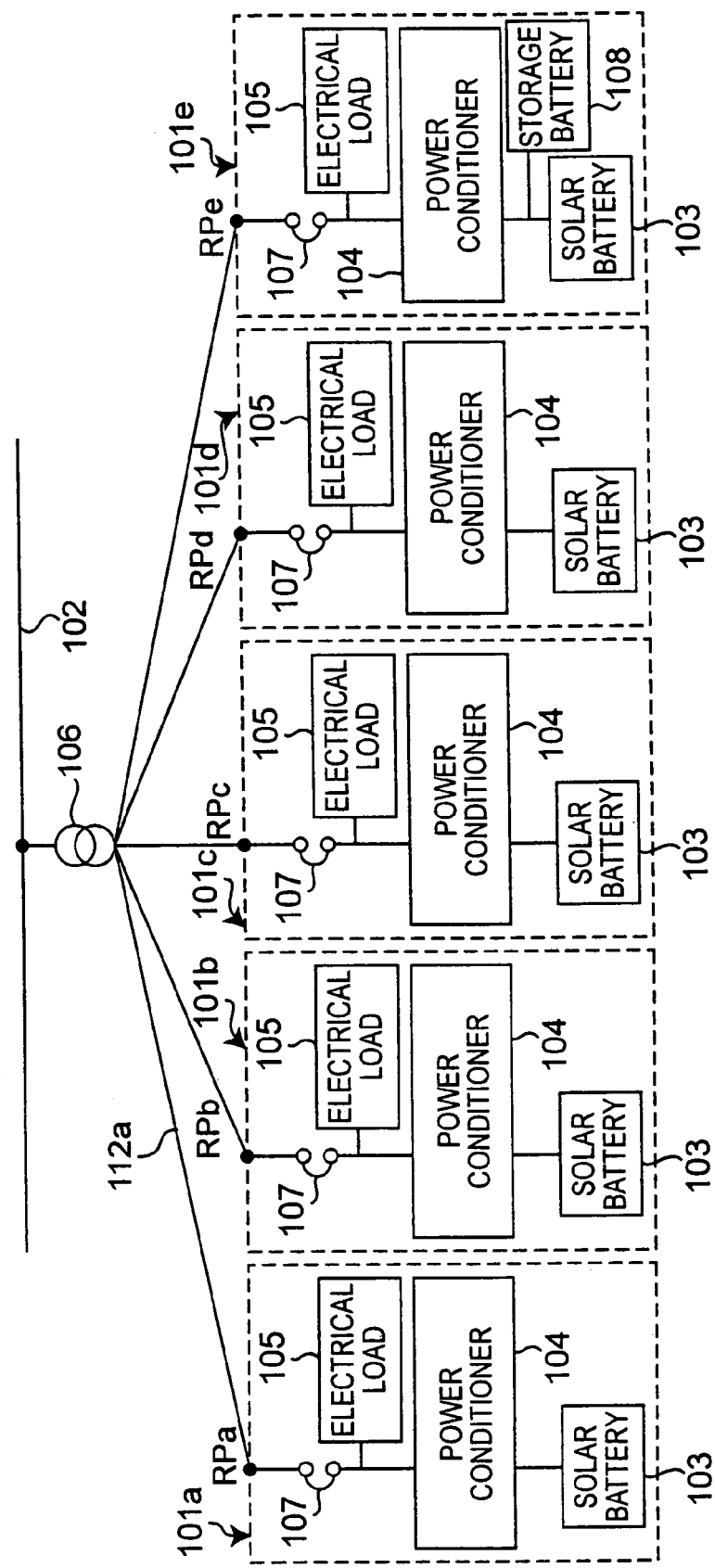
FIG. 3 is a block diagram showing a conventional power supply system.

Moreover, explaining in detail the dispersed power source 1a referring to FIG. 2 (the dispersed power source 1a will be described hereinafter, and the same thing can be said for the dispersed power sources 1b through 1e), the power conditioner 4 includes a main circuit 10 for transforming a DC power from the solar battery 3 into an AC power, a control circuit 11 for controlling this main circuit 10, a transmitter-receiver circuit 12 that serves as one example of a transmission means and a reception means for executing transmission and reception with the management unit 9, a charger circuit 13 that serves as one example of a rectification means for transforming an AC power into a DC power and charging the storage battery 8, and a booster circuit 14 for boosting the DC power from the storage battery 8 and inputting the resulting power to the main circuit 10. The dispersed power source 1a normally transforms a DC power obtained by executing the maximum power point tracking control for producing the maximum output from each of the solar cell strings 3a, 3b and 3c in the power conditioner 4 in the daytime during which there is light of solar radiation into an AC power in the main circuit 10 and the control circuit 11 and supplies the AC power to an electrical load 5. The solar cell strings 3a, 3b and 3c constitute the solar battery 3. When the light of solar radiation is a little, the electric power to the electrical load 5 cannot be supplied with only the electric power produced from the solar cell strings 3a through 3c, and therefore, the electric power of the shortage is supplied from the commercial power system 2. When there is an abundance of light of solar radiation, the electric power produced from the solar cell strings 3a through 3c cannot be consumed by only the electrical load 5, and therefore, the surplus power is supplied to the commercial power system 2 (a reverse power flow occurs).

It is herein assumed that a reverse power flow is occurring to the commercial power system 2 from the dispersed power sources 1a through 1e connected to the transformer 6. As described above, when the reverse power flow produces from the dispersed power sources 1a through 1e to the commercial power system 2, voltages at the power receiving points RPa through RPe of the dispersed power sources 1a through 1e increase further than when no reverse power flow produces, and the increase value $\Delta V$ is determined by the internal impedance of the transformer 6, the impedance of the wiring lines 22a through 22e extended from the power receiving points RPa through RPe to the transformer 6 and the generated current of the reverse flow. In addition, if the above-mentioned current is large, then the voltages at the power receiving points RPa through RPe of the dispersed power sources 1a through 1e disadvantageously exceed the upper limit of the proper value (within 101±6 V) stipulated by the Electricity Enterprises Act. Assuming that the voltage at the power receiving point RPa of the dispersed power source 101a exceeds the upper limit of the proper value earlier than the voltages at the power receiving points RPb through RPe of the other dispersed power sources 1b through 1e, the power conditioner 4 firstly voluntarily controls its own output so as not to exceed the upper limit of the proper value. In concrete, if the voltage at the power receiving point RPa of the dispersed power source 1a exceeds the upper limit of the proper value, then the power conditioner 4 charges the storage battery 8 with part of the output power while continuing the normally executed maximum power point tracking control. By this operation, the power conditioner 4 tries to control an increase in the voltage at the power receiving point RPa of the dispersed power source 1a by reducing the current that is reversely flowing from the dispersed power source 1a to the commercial power system 2. Next, the dispersed power source 1a transmits an output suppression start signal to the management unit 9 via the transmitter-receiver circuit 12. In concrete, when the output suppressing control is started by supplying an AC power from the main circuit 10 to the charger circuit 13 under the control of the control circuit 11 inside the power conditioner 4, a command for outputting the output suppression start signal is issued to the transmitter-receiver circuit 12, and the transmitter-receiver circuit 12 transmits the output suppression start signal to the management unit 9. Then, the management unit 9, which receives the output suppression start signal from the dispersed power source 1a, transmits an output suppression command signal to the other dispersed power sources 1b through 1e. The dispersed power sources 1b through 1e, which receive this output suppression command signal, starts control so as to suppress the output in accordance with the dispersed power source 1a. In concrete, similarly to the dispersed power source 1a, the storage battery 8 is charged with part of the output power while continuing the maximum power point tracking control normally executed by the power conditioner 4 in each of the dispersed power sources 1b through 1e. By this operation, the current reversely flowing from the dispersed power sources 1a through 1e to the commercial power system 2 is reduced, and the current flowing in the transformer 6 is reduced. Therefore, the increase in the voltage at the power receiving point RPa of the dispersed power source 1a is suppressed. As described above, the dispersed power source 1a, of which the voltage at the power receiving point RPa exceeds the upper limit of the proper value, can suppress the increase in the voltage at the power receiving point RPa by storing part of the output power into the storage battery 8. On the other hand, the other dispersed power sources 1b through 1e, of which the voltages at the power receiving points RPb through RPe do not exceed the upper limit of the proper value, suppress part of the AC power to be supplied to the commercial power system 2 in order to suppress the increase in the voltage at the power receiving point RPa of the dispersed power source 1a and stores the suppressed part into the storage battery 8. Therefore, the outputs of the dispersed power sources 1a through 1e can be impartially suppressed, and the suppressed part is stored into the storage battery 8 of each of the dispersed power sources 1a through 1e. Therefore, the generated power of the power conditioner 4 of each of the dispersed power sources 1a through 1e is almost left unchanged, and the electric power from the solar battery 3 can be effectively utilized. Moreover, when the DC power from the solar battery 3 runs short, the DC power stored in the storage battery 8 is boosted by the booster circuit 14 inside the power conditioner 4, inputted to the main circuit 10, transformed into an AC power together with the DC power from the solar battery 3 and supplied to the electrical load 5. Therefore, the AC power of the suppressed part can also be effectively utilized.

Moreover, with regard to a method for storing part of the output power into the storage battery 8 when the output is suppressed, the electric power to be stored into the storage battery 8 is gradually increased at a constant rate of increase. Then, the current reversely flowing from the dispersed power sources 1a through 1e to the commercial power system 2 is gradually reduced. Then, the voltage at the power receiving point RPa is to be gradually reduced. Therefore, the voltage at the power receiving point RPa is not excessively reduced.

In this case, it is assumed that the dispersed power source 1a among the dispersed power sources 1a through 1e connected to the transformer 6 starts the output suppression and the other dispersed power sources 1b through 1e start the output suppression following the dispersed power source 1a by the management unit 9. If the voltage at the power receiving point RPa of the dispersed power source 1a is gradually lowered by the output suppression and falls within the proper value range, then the power conditioner 4 of the dispersed power source 1a firstly stops charging part of the output power into the storage battery 8 and continues the normally executed maximum power point tracking control. Next, the dispersed power source 1a transmits an output suppression cancel signal to the management unit 9. In concrete, if the output suppressing control is canceled by the control circuit 11 in the power conditioner 4, then a signal for canceling the output suppressing control is transmitted to the transmitter-receiver circuit 12, and the transmitter-receiver circuit 12 transmits an output suppression cancel signal to the management unit 9. Then, the management unit 9, which receives the output suppression cancel signal from the dispersed power source 1a, transmits an output suppression cancel command signal to the other dispersed power sources 1b through 1e. The dispersed power sources 1b through 1e, which receive this output suppression cancel command signal, executes the control of canceling the output suppression in accordance with the dispersed power source 1a. In concrete, similarly to the dispersed power source 1a, the power conditioner 4 stops charging part of the output power into the storage battery 8 in the other dispersed power sources 1b through 1e and continues the normally executed maximum power point tracking control. By this operation, the output suppression, which has been executed by the dispersed power sources 1a through 1e, can be canceled. If the voltage at the power receiving point of any of the dispersed power sources exceeds again the upper limit of the proper value after the dispersed power sources 1a through 1e cancel the output suppression, then the aforementioned output suppression is to be executed.

An advantage when part of the output power of the power conditioner 4 is stored into the storage battery 8 during the output suppression under the management of the management unit 9 will be described next. If the output suppression is executed by the management unit 9, the capacity of the storage battery 8 is allowed to be smaller than when the output suppression is independently executed by utilizing the storage battery 8 by each dispersed power source without using the management unit 9. This is because, assuming that the voltage at, for example, the power receiving point RPa of the dispersed power source 1a exceeds the upper limit of the proper value, then the dispersed power source 1a reduces the current reversely flowing to the commercial power system 2 and stores the output power of the reduced part into the storage battery 8, when part of the current to be normally reduced by the dispersed power source 1a is shared by the other dispersed power sources 1b through 1e by the management unit 9, and part of the output power to be normally stored into the storage battery 8 by the dispersed power source 1a is also shared by the other dispersed power sources 1b through 1e. Therefore, the dispersed power sources 1a through 1e, of which the outputs are suppressed by the management unit 9, are allowed to have a small capacity of the storage battery 8.

By executing the aforementioned operation, in the present embodiment, the partiality of the output suppression of the plurality of dispersed power sources 1a through 1e is eliminated with regard to the output suppressing control of the plurality of dispersed power sources 1a through 1e linked to the high-voltage-to-low-voltage transformer 6 of the commercial power system, and the capacity of the storage batteries 8 of the dispersed power sources 1a through 1e can be reduced, making it possible to prevent the cost increase.

The dispersed power sources 1a through 1e and the management unit 9 will be more concretely described. The main circuit 10 of the dispersed power source 1a includes a transformation means constructed of an inverter section, as shown in FIG. 2. Moreover, as shown in FIG. 2, the control circuit 11 includes a maximum power point tracking control means 11b, an output suppressing means 11c and an output suppression canceling means 11d respectively constructed of software of a microcomputer or DSP (Digital Signal Processor) in addition to the voltage detection means (voltage detection sensor) 11a for detecting the voltage at the power receiving point RPa.

The maximum power point tracking control means 11b executes control for producing the maximum output from each of the solar cell strings 3a, 3b and 3c regardless of a change in the quantity of light of solar radiation (refer to Japanese Patent Publication No. 3111273).

The output suppressing means 11c determines whether or not the voltage at the power receiving point RPa detected by the voltage detection means 11a exceeds the upper limit of the proper value. When the voltage at the power receiving point RPa exceeds the upper limit of the proper value, the output suppressing means 11c controls the main circuit 10 to execute the control of suppressing the AC power supplied from the transformation means 10a to the power receiving point RPa, transforming the AC power from the transformation means 10a into a DC power by the charger circuit 13 and supplying the resulting power to the storage battery 8. As described above, the DC power obtained by rectifying the AC power from the transformation means 10a by the charger circuit 13 is supplied to the storage battery 8. Therefore, the storage battery 8 can be charged with the surplus power while continuing the maximum power point tracking control for producing the maximum power from each of the solar cell strings 3a, 3b and 3c as it is without limitation.

Furthermore, the output suppressing means 11c executes the output suppressing control, outputs the signal to the transmitter-receiver circuit 12, and the output suppression start signal is transmitted from the transmitter-receiver circuit 12 to the management unit 9 located in a remote place. Upon receiving the output suppression start signal by the transmitter-receiver circuit 9a, the management unit 9 transmits the output suppression command signal to the dispersed power sources 1b through 1e other than the dispersed power source 1a that has transmitted the output suppression start signal. Then, the other dispersed power sources 1b through 1e, which receive the output suppression command signal, also store electric power into the storage battery 8 and suppress the outputs thereof.

As described above, it is possible to make the plurality of dispersed power sources 1a through 1e impartially suppress the outputs under the management of the management unit 9, so that the voltages at the power receiving points of the dispersed power sources 1a through 1e can reliably be suppressed within the proper value range.

On the other hand, upon determining that the voltage at the power receiving point RPa has become equal to or lower than the upper limit of the proper value on the basis of the output of the voltage detection means 11a, the output suppression canceling means 11d of the dispersed power source 1a cancels the output suppression by the output suppressing means 11c in the dispersed power source 1a and transmits the output suppression cancel signal to the management unit 9 via the transmitter-receiver circuit 12. Upon receiving the output suppression cancel signal, the management unit 9 transmits the output suppression cancel command signal to the dispersed power sources 1b through 1e other than the dispersed power source 1a that has transmitted the output suppression cancel signal. Upon receiving the output suppression cancel command signal via the transmitter-receiver circuit 12, the output suppression canceling means 11d of the other dispersed power sources 1b through 1e cancel the control of the output suppression by the output suppressing means 11c.

As described above, if the voltage at the power receiving point RPa of the dispersed power source 1a that is suppressing the output becomes equal to or lower than the upper limit of the proper value and the need for suppressing the output is obviated, then the plurality of dispersed power sources 1a through 1e can be made to impartially cancel the output suppression under the management of the management unit 9 located in a remote place.

As is apparent from the above, according to the output suppressing method of the plurality of dispersed power sources of the present invention, if the voltage at the power receiving point of a certain dispersed power source exceeds the upper limit of the proper value, then the output of the dispersed power source is suppressed, and the outputs of the other dispersed power sources of which the voltages at the power receiving points do not exceed the upper limit of the proper value are also suppressed. Therefore, the voltages at the power receiving points of the dispersed power sources can reliably be suppressed within the proper value range, and the outputs of the plurality of dispersed power sources linked to the same high-voltage-to-low-voltage transformer of the commercial power system can be impartially suppressed.

Moreover, according to the dispersed power source managing system of the present invention, the output suppressing means determines whether or not the voltage at the power receiving point detected by the voltage detection means exceeds the upper limit of the proper value in each of the dispersed power sources. If the voltage at the power receiving point exceeds the upper limit of the proper value, the output suppressing means executes the control so as to suppress the AC power to be supplied to the power receiving point and supply the electric power to the storage battery and transmits the output suppression start signal to the management unit. On the other hand, upon receiving the output suppression start signal, the management unit transmits the output suppression command signal to the dispersed power sources other than the dispersed power source that has transmitted the output suppression start signal. Therefore, the plurality of dispersed power sources can be made to impartially suppress the outputs, so that the voltages at the power receiving points of the dispersed power sources can be reliably suppressed within the proper value range.

Moreover, according to the dispersed power source managing system of the present invention, if the output suppression canceling means of a dispersed power source that has transmitted the output suppression start signal determines that, on the basis of the output of the voltage detection means of the dispersed power source, the voltage at the power receiving point has become equal to or lower than the upper limit of the proper value, then the output suppression canceling means cancels the suppression of the output by the output suppressing means in the dispersed power source, transmits the output suppression cancel signal to the management unit via the transmission means. On the other hand, upon receiving the output suppression cancel signal, the management unit transmits the output suppression cancel command signal to the dispersed power sources other than the dispersed power source that has transmitted the output suppression cancel signal. Therefore, if the voltage at the power receiving point of the dispersed power source that is suppressing the output becomes equal to or lower than the upper limit of the proper value and the need for suppressing the output is obviated, then the plurality of dispersed power sources can be made to impartially cancel the output suppression under the management of the management unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An output suppressing method of a plurality of dispersed power sources comprising:
   gradually suppressing an output of a dispersed power source when a determination is made, at an exceeding power source of the plurality of dispersed power sources, that a voltage at a power receiving point of the exceeding power source among the plurality of dispersed power sources exceeds an upper limit of a proper value, the power receiving point being linked to a high-voltage-to-low-voltage transformer of a commercial power system;
   in response to the determination, further gradually suppressing outputs of the other dispersed power sources of which the voltages at power receiving points do not exceed the upper limit of the proper value;
   canceling by itself an output suppression of the dispersed power source of which the voltage at the power receiving point has exceeded the upper limit of the proper value when the voltage at the power receiving point of the dispersed power source becomes equal to or lower than the upper limit of the proper value; and then
   further canceling an output suppression of the other dispersed power sources of which the voltages at the power receiving points do not exceed the upper limit of the proper value.

2. The output suppressing method of claim 1, comprising:
   in response to the determination, transmitting an output suppression start signal from the exceeding power source to a management unit;
   transmitting an output suppression command signal from the management unit to the dispersed power sources other than the exceeding dispersed power source that has transmitted the output suppression command signal; and
   gradually suppressing the output of the dispersed power source that has received the output suppression command signal.

3. The output suppressing method of claim 2, comprising:
   canceling control of the output suppression of the exceeding power source that has transmitted the output suppression start signal, by the exceeding power source itself when the voltage at the power receiving point of the exceeding power source becomes equal to or lower than the upper limit and transmitting an output suppression cancel signal from the exceeding power source to the management unit;
   transmitting an output suppression cancel command signal from the management unit that has received the output suppression cancel signal to the dispersed power sources other than the exceeding power source that has transmitted the output suppression cancel signal; and canceling the suppression of the output of the dispersed power source that has received the output suppression cancel command signal.

4. The output suppressing method of claim 1, wherein each of the dispersed power sources comprises a DC power source;
   a transformation section for transforming a DC power from the DC power source into an AC power and outputting the AC power;
   a storage battery;
   a rectification section for rectifying an AC power and outputting a DC power; wherein
   storing a suppression power corresponding to the suppressed part into the storage battery inside the dispersed power source while gradually increasing the suppression power to be stored; and
   inputting an DC power from the storage battery into the transformation section to output an transformed AC power from the transformation section.

5. A dispersed power source managing system comprising:
   a plurality of dispersed power sources linked to a high-voltage-to-low-voltage transformer of a commercial power system; and
   a management unit for managing the plurality of dispersed power sources; wherein
   the dispersed power sources each comprises:
      a DC power source;
      a transformation section for transforming a DC power from the DC power source into an AC power and outputting the AC power;
      a storage battery;
      a voltage detection section for detecting a voltage at a power receiving point;
      an output suppressing section for gradually suppressing the AC power to be supplied to the power receiving point when the voltage at the power receiving point exceeds an upper limit of a proper value and supplying an electric power to the storage battery;
      an output suppression canceling section for canceling the output suppression by the output suppressing section when the voltage at the power receiving point becomes equal to or lower than the upper limit of the proper value;
      a transmission section for transmitting an output suppression start signal and an output suppression cancel signal to the management unit on the basis of outputs of the output suppressing section and the output suppression canceling section; and
      a reception section for receiving an output suppression command signal and an output suppression cancel command signal for operating the output suppressing section and the output suppression canceling section from the management unit, and
   wherein the management unit comprises:
      a reception section for receiving the output suppression start signal and the output suppression cancel signal from each of the dispersed power sources and
      a transmission section for transmitting the output suppression command signal and the output suppression cancel command signal to each of the dispersed power sources.

6. The dispersed power source managing system as claimed in claim 5, wherein
   the dispersed power sources each comprises a rectification section for rectifying an AC power from the transformation section and forming a DC power;
   the suppression power corresponding to the part suppressed by the output suppressing section is transformed from the AC power to a DC power by the rectification section and stored into the storage battery; and
   an DC power is inputted from the storage battery into the transformation section to output an transformed AC power from the transformation section.

7. The dispersed power source managing system as claimed in claim 5, wherein
the DC power source is a solar battery.

8. A dispersed power source managing system comprising:
a plurality of dispersed power sources; and
a management unit for managing the plurality of dispersed power sources; wherein
the dispersed power sources each comprises:
   a DC power source;
   a transformation section for transforming a DC power from the DC power source into an AC power and outputting the AC power;
   a voltage detection section for detecting a voltage at a power receiving point;
   an output suppressing section for gradually suppressing the AC power to be supplied to the power receiving point when the voltage at the power receiving point exceeds an upper limit of a proper value;
   an output suppression canceling section for canceling the output suppression by the output suppressing section when the voltage at the power receiving point becomes equal to or lower than the upper limit of the proper value;
   a transmission section for transmitting an output suppression start signal and an output suppression cancel signal to the management unit on the basis of outputs of the output suppressing section and the output suppression canceling section; and
   a reception section for receiving an output suppression command signal and an output suppression cancel command signal for operating the output suppressing section and the output suppression canceling section from the management unit, and
wherein the management unit comprises:
   a reception section for receiving the output suppression start signal and the output suppression cancel signal from each of the dispersed power sources and
   a transmission section for transmitting the output suppression command signal and the output suppression cancel command signal to each of the dispersed power sources.

9. The dispersed power source managing system as claimed in claim 8, wherein the DC power source is a solar battery.

* * * * *